(12) United States Patent
Litchfield et al.

(10) Patent No.: US 11,982,494 B2
(45) Date of Patent: May 14, 2024

(54) MULTI-PURPOSE HEAT TRANSFER AND STORAGE DEVICE

(71) Applicant: SUN BUCKETS, INC., Champaign, IL (US)

(72) Inventors: J. Bruce Litchfield, Champaign, IL (US); Matthew Paul Alonso, Urbana, IL (US); Joe Bradley, Champaign, IL (US)

(73) Assignee: Sun Buckets Inc., Champaign, IL (US)

( * ) Notice: Subject to any disclaimer, the term of this patent is extended or adjusted under 35 U.S.C. 154(b) by 1288 days.

(21) Appl. No.: 16/304,946

(22) PCT Filed: May 28, 2017

(86) PCT No.: PCT/US2017/034885
§ 371 (c)(1),
(2) Date: Nov. 27, 2018

(87) PCT Pub. No.: WO2017/205864
PCT Pub. Date: Nov. 30, 2017

(65) Prior Publication Data
US 2021/0318034 A1 Oct. 14, 2021

Related U.S. Application Data

(60) Provisional application No. 62/392,317, filed on May 27, 2016.

(51) Int. Cl.
*F28D 20/02* (2006.01)
*B65D 81/38* (2006.01)
(Continued)

(52) U.S. Cl.
CPC ............ *F28D 20/02* (2013.01); *B65D 81/38* (2013.01); *F24S 20/30* (2018.05); *F24S 50/20* (2018.05);
(Continued)

(58) Field of Classification Search
CPC . F28D 20/02; F24S 20/20; F24S 20/30; F24S 50/20; F24S 60/10; A47J 37/0629; F24F 5/0021; F24D 2220/10
See application file for complete search history.

(56) References Cited

U.S. PATENT DOCUMENTS 3,807,194 A * 4/1974 Bond .................. F25D 3/06
62/438
4,896,452 A * 1/1990 Smith .................. A01K 97/05
43/17.1
(Continued)

OTHER PUBLICATIONS

International Search Report dated Aug. 4, 2017 for International Application No. PCT/US2017/034885, 2 pages.

*Primary Examiner* — Syed O Hasan
(74) *Attorney, Agent, or Firm* — McDonnell Boehnen Hulbert & Berghoff LLP

(57) ABSTRACT

Devices, systems, and methods relating to providing a portable, rechargeable vessel for collecting, storing, and recovering thermal energy are provided. In one aspect, vessel includes a structure defining a well and an open-top portion at the top of the well; a phase-change material, wherein the phase-change material is disposed in the well, the phase-change material being configured to change phase at temperature in the range of 110-700° C.; one or more thermally-conductive fins interleaved in the phase-change material; and a thermally-conductive heat transfer plate disposed at and substantially covering the open-top portion of the structure, in direct thermal contact with the one or more fins, thereby allowing the transfer plate to directly exchange thermal energy with the phase change material.

20 Claims, 7 Drawing Sheets

(51) Int. Cl.
  *F24S 20/30*   (2018.01)
  *F24S 50/20*   (2018.01)
  *F24S 60/10*   (2018.01)
  *F24S 70/20*   (2018.01)
  *F24S 70/60*   (2018.01)
  *F28F 3/04*    (2006.01)
  *F28F 21/08*   (2006.01)

(52) U.S. Cl.
  CPC ............... *F24S 60/10* (2018.05); *F24S 70/20* (2018.05); *F24S 70/60* (2018.05); *F28F 3/048* (2013.01); *F28F 21/084* (2013.01); *F28F 2275/06* (2013.01)

(56) References Cited

U.S. PATENT DOCUMENTS

| | | | |
|---|---|---|---|
| 5,271,244 A | 12/1993 | Staggs | |
| 5,406,808 A | 4/1995 | Babb et al. | |
| 2014/0263368 A1* | 9/2014 | Booska | B65D 81/3484 220/592.17 |
| 2017/0176118 A1* | 6/2017 | Patterson | H01L 23/4275 |

\* cited by examiner

MULTI-PURPOSE HEAT TRANSFER AND STORAGE DEVICE

CROSS-REFERENCE TO RELATED APPLICATIONS

This application is a U.S. national phase application of International Patent Application no. PCT/US2017/034885, filed May 28, 2017. International Patent Application no. PCT/US2017/034885 claims the benefit of priority of U.S. Provisional Patent Application No. 62/392,317, filed May 27, 2016, which is hereby incorporated herein by reference in its entirety.

BACKGROUND

Many modern solar energy harvesting and recovery methods rely on archaic, often ineffective, technologies. For example, many devices and systems aimed at utilizing solar thermal energy to accomplish any number of useful tasks do so by aggregating and/or amplifying solar thermal energy and harvesting it as, or almost immediately after, it is collected.

In the context of solar cooking devices, the most common examples of these devices and systems are as box, panel, and concentrating solar cookers. Although useful to some degree, these devices and cooking methods have several disadvantages over more traditional methods (such as expending common fuel sources like wood, coal, animal waste, and other such materials in an open fire). Further, these disadvantages present obvious limitations (e.g., the box, panel, and concentrating solar cookers may not reach the same operating temperature as fire), cultural insensitivities (e.g., preparing some types of foods may not be possible with these devices), or unavoidable impracticalities (e.g., these devices may be useless at night), amongst other possibilities.

Additionally, because these technologies have been historically focused on processes to cook food by heating it to the minimal degree or extent that it becomes edible, without any regard to the cultural factors of potential users, they do not provide an adequate solution to satisfy (or even mimic) the preferred food characteristics and cooking habits of many cultures (e.g., those that require high temperatures to sear, deep fry, pan fry, bake, and boil certain foods). Accordingly, these technologies have been slow to catch on internationally.

Thus, an effective, efficient, and culturally-focused means of collecting, storing, and recovering solar thermal energy, particularly in the context of portable heat transfer devices, has presented and continues to present an attractive prospect for users around the world.

SUMMARY

Example embodiments may facilitate the collection, storage, and recovery of thermal energy from the sun through the use of a portable, rechargeable vessel having a phase-change material disposed therein. In particular, a portable, rechargeable vessel of the disclosure can be configured such that thermal energy can be conducted to the phase-change material to heat it and change its phase, for example by placing it substantially at the focal point of a parabolic reflector or Fresnel lens (among other possibilities) to collect thermal energy (for example, via concentrated sunlight), thereby storing heat in the phase-changed material. The vessel can be insulated (e.g., by an external case, or by the use of insulated walls) such that it retains the stored heat until recovery is sought by a user. Other examples are certainly possible.

In one aspect of the disclosure, a portable, rechargeable vessel for collecting, storing, and recovering thermal energy is provided, which comprises a structure defining a well (e.g., having one or more side walls and bottom) and an open-top portion at the top of the well. The device further comprises a phase-change material, wherein the phase-change material is disposed in the well and is configured to change phase at a desired temperature, e.g., in the range of 300-400° C. The vessel additionally comprises one or more thermally-conductive fins disposed in the phase-change material. The vessel also comprises a thermally-conductive transfer plate disposed at and substantially covering the open-top portion of the structure, and in direct thermal contact with the fin, thereby allowing the transfer plate to directly exchange thermal energy with the fin. In use, the fin can transfer thermal energy from the transfer plate to the phase-change material. The phase-change material can thus undergo a phase change and heated by heating the transfer plate, through heat transfer by the fin. In certain embodiments, the structure defining the well is at least partially made of a thermally-conductive material which is also in direct contact with the transfer plate; in such embodiments, the thermally-conductive material defining the well can, like the fin, transfer heat energy from the transfer plate to the phase-change material.

In another aspect, another device is provided. The device involves, surrounding the structure of the vessel, an insulating case configured to surround the well. The insulating case, can, for example, comprise a bottom portion having one or more side walls and a closed bottom. The device further comprises a top portion having one or more side walls. The device additionally comprises one or more thermally-insulative materials between the exterior of the bottom and side wall of the structure and the interior of the top and bottom portions of the case. The case can include an opening at the top of the top portion, with the opening being configured to allow access to the transfer plate. The case can further include an insulating lid configured to cover the opening and insulate the transfer plate. The case can also include one or more handles, attached to the exterior of the case.

In yet another aspect, a system is provided. The system provides for collecting and storing thermal energy. The system includes a source of thermal energy, and a vessel as described herein, disposed such that its thermally conductive heat-transfer plate is operatively coupled to the heat source. The source of thermal energy can be, for example, a source of solar thermal energy, such as a curved (e.g., parabolic) reflector or a lens (e.g., a Fresnel lens) with the heat transfer plate of the vessel disposed substantially at the focal point thereof. The system can comprise a stand configured to hold the vessel such that the transfer plate of the vessel is operatively coupled to the heat source, e.g., by being disposed substantially at the focal point of a curved mirror or a lens.

In yet another aspect, a method is provided. The method involves cutting one or more slots extending from the top or the bottom of each fin. The method also involves attaching each fin to the bottom of the transfer plate. The method further involves heating the phase change material to a temperature at which the phase change material is a liquid, for example, its maximum thermal operating point, wherein the maximum thermal operating point is equal to or less than the boiling point of the phase change material. The method additionally involves interfacing the transfer plate with the open-top portion of the structure such that the one or more fins are submersed into the liquefied phase change material and any undispersed air escapes through the one or more slots. The method also involves, after the transfer plate is interfaced with the open-top portion of the structure, welding the transfer plate to the structure at its interface with the structure.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
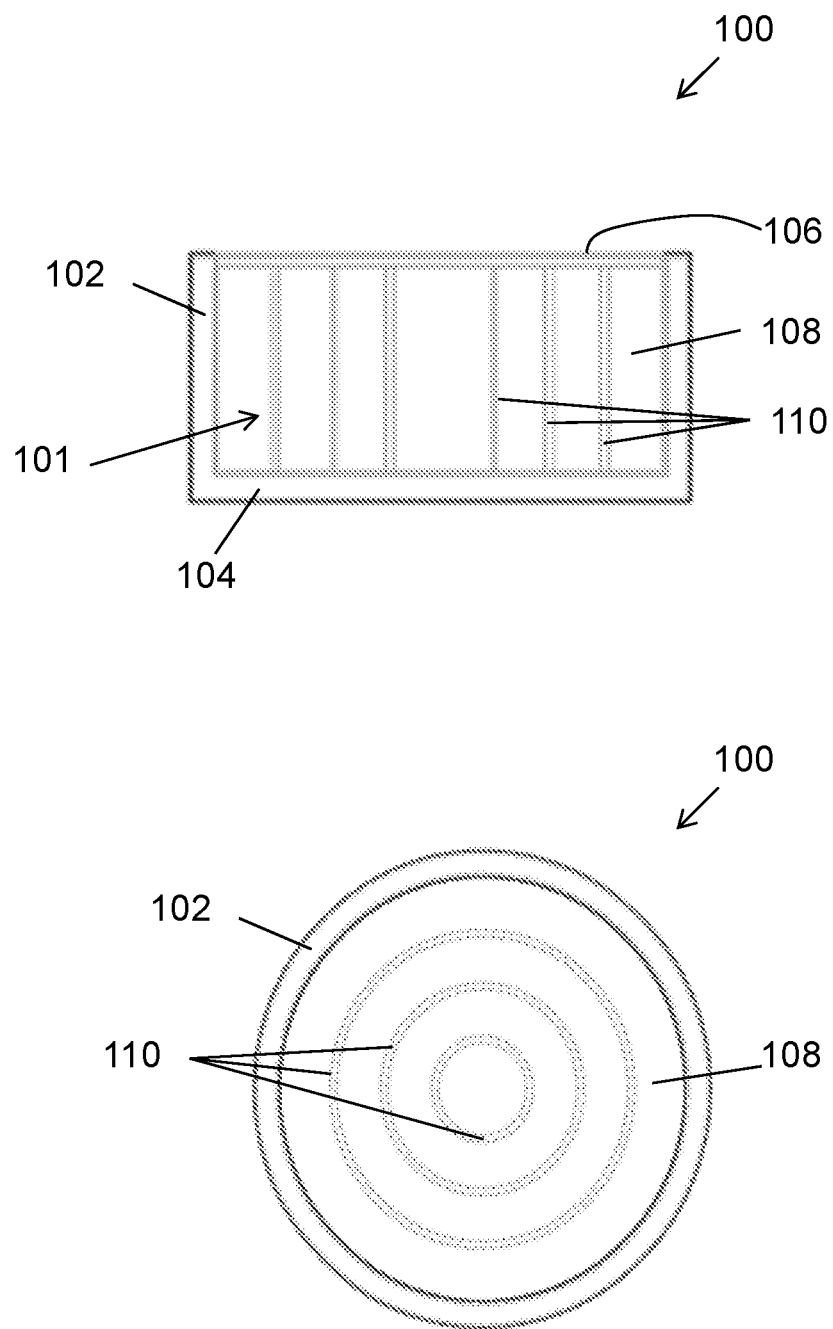
FIG. 1 is a simplified illustration of a portable, rechargeable vessel for collecting, storing, and recovering thermal energy.

Example devices, systems, and methods are described herein. Any example embodiment or feature described herein should not be necessarily construed as preferred or advantageous over other embodiments or features. Specifically, the example embodiments described herein are not meant to be limiting. Thus, it will be readily understood that certain aspects of the disclosed devices, systems, and methods can and may be rearranged and combined in an extensive range of configurations, all of which should be regarded as contemplated herein.

Furthermore, it should also be understood that the configurations illustrated in the particular arrangements shown in the Figures are also not limiting, but are only for illustrating example embodiments of the invention disclosed herein.

Collecting, storing, and recovering thermal energy, particularly in the context of portable heat-transfer devices, has presented and continues to present an attractive prospect for users around the world due to a large number of factors, not the least of which include reduced costs to the user; but this prospect has been limited to date.

Specifically, when attempting to collect and harness a reliable source of heat on which they could depend for their continued warming, drying, and cooking needs, humans have primarily relied on traditional fuel sources such as wood, coal, animal waste, petroleum, etc., which, to date, have presented the most attractive and reliable options. With such fuel sources, however, come the costs of gathering and/or procuring these materials. In particular, whether it is sweat equity or a direct monetary burden, these fuel sources present a substantial, often unpredictable, burden to the user. Further, these costs are perhaps no more evident or burdensome than to users in developing countries, who often have to rely on them the most.

Thus, when considering a reliable and attractive alternative to these fuel sources, one key factor would be to reduce (or potentially eliminate) these variable costs to the collector/user, which again can often times be detrimental to the low-income families that rely on these fuel sources almost exclusively. For example, meaningful solar energy storage would be useful and could address the cultural factors by providing energy when needed in the daily cooking schedules of people throughout numerous parts of the world and their cultures.

One set of solutions that has been explored to address this problem (at least in part) have been attempts to harvest the sun's energy to cook food. Traditionally, these solutions have included various solar cooker designs aimed at baking, boiling, and/or frying foods, which are often classified as box, panel, and concentrating solar cookers.

Box- and panel-type cookers, however, are often limited as they typically only reach temperatures just above the boiling point of water and are best utilized when set up and left in direct sunlight for several hours cooking the foods contained therein. This scenario presents at least three problems.

First, because they store low amounts of energy, almost exclusively, in the thermal mass of the structure and the air trapped inside that structure, these types of cookers take a long time to complete seemingly minor cooking tasks—leaving the user no other option than to stand by and observe the food as it cooks, or run the risk of losing or potentially overcooking the food in his or her absence.

Second, because these box- and panel-type cookers do not store heat in any appreciable regard, they rely exclusively on direct (or substantially direct) sunlight. This shortcoming results in number of problems, not the least of which is that at best these cookers only cook in direct sunlight and keep food warm while the sun sets, but cannot cook additional food during the evening—thereby becoming virtually useless for large portions of the day. Accordingly, users are forced to cook only during the day, no matter their individual or cultural needs.

Third, these types of cookers do not allow the user to adjust to their cultural cooking needs (or preference) because they typically provide a very limited, relatively low-temperature, cooking range, which is very different from the high-heat and rapid cooking that is achieved when using fire. Thus, many foods that require high temperatures to sear, deep fry, pan fry, bake, and boil, which may play a large cultural role in the user's life, are foreclosed when employing these types of cookers.

Disclosed herein are example embodiments relating to devices, systems, and methods that help and allow a user of a multi-purpose portable heat-transfer device effectively and efficiently collect, store, and transfer solar thermal energy harvested from sunlight.

In particular, the example embodiments disclosed herein enable a user to understand and build a portable, rechargeable vessel for collecting, storing, and recovering thermal energy, especially solar thermal energy. For example, these embodiments disclose an structure filled with a phase change material and one or more thermally-conductive fins in contact with a heat transfer plate. In a further aspect, to improve the collection, storage, and transfer of the thermal energy in connection with the vessel, the embodiments herein also disclose a number of additional features for the vessel, including a phase-change material (e.g., a meltable salt) configured to change phase at a temperature in the range of 120° C. to 600° C., e.g., 300-400° C., and the addition of a solar absorptive layer appended to the exterior facing portion of the transfer plate to attract more solar energy to the transfer plate, and thereby the vessel itself. Additionally, although the Figures disclosed herein illustrate the vessel as being cylindrical, the vessel could be made up of one or more additional shapes including those which may be cuboidal, spherical (wherein the one or more side walls and the bottom may form a continuous structure, akin to an open-topped sphere or a fish bowl, among other possibilities), conical, or pyramidal, and so on.

In a further aspect, the example embodiments herein also disclose details allowing a user to understand and build a thermally insulative case that allows the user to further facilitate the collection, storage, and recovery of thermal energy, by enabling more efficient storage of energy collected in the vessel, as well as allowing the physical handling and transport of the vessel in a safe and effective manner. In particular, the example embodiments described herein disclose details relating to the vessel, thermally charged or otherwise, by detailing a case surrounding the vessel, which includes a rigid case with an opening that aligns with the heat transfer plate of the vessel (to avoid its obstruction from the sun), thermally insulative materials between the case and the vessel, and one or more handles attached to the exterior of the case, which allow for user handling and transport that is both safe and operative.

In another aspect, the example embodiments disclosed herein allow a user to effectively harvest thermal energy from the sun by placing the transfer plate of the thermally-encased portable vessel such that it is operatively coupled to a source of thermal energy, for example, solar thermal energy, until a desired temperature is reached, and then remove the vessel from the source of thermal energy, and handle (e.g., transport) the thermally charged vessel at no detriment to the user. For example, this heat transfer plate may be placed at the focal point of a parabolic reflector, whereby the transfer plate (and the vessel) may receive thermal energy from the parabolic reflector, which is configured to focus sunlight directly on the transfer plate of the vessel. Other lenses and solar concentrators may be used in a similar fashion (e.g., placing the transfer plate of the vessel at the focal point of a lens such as a Fresnel lens). In still other examples, the example embodiments disclosed herein also herein allow a user to harvest thermal energy from the sun by placing the transfer plate of the thermally-encased portable vessel in contact with an electrical heater configured to receive electrical energy from one or more photovoltaic cells.

In another aspect, the example embodiments disclosed herein allow a user to effectively harvest thermal energy from sources other than the sun. For example, a user may harvest thermal energy by placing the transfer plate of the thermally-encased portable vessel in thermally-conductive contact with one or more heat sources that created as a by-product of another desired result (e.g., heat from car, truck, and/or bus engines, heat from generators, and so on) and may other go uncaptured and unused (hereinafter referred as "waste heat sources"). Other examples are certainly possible.

In a further aspect, the vessel, case, and handles described above may be further configured to include a thermocouple terminating at one end at the core of the vessel and the other outside the case. In a further aspect, this thermocouple may be used to monitor the core temperature of the vessel while the vessel receives thermal energy from the sun (i.e., "charges") via the heat transfer plate.

In another aspect, the vessel, case, and handles described above may also be further configured to include a thermometer terminating at a probe end at the core of the vessel and the other, which may include an analog or digital readout and/or display, outside the case (e.g., a dial face readout on one end and a metallic probe on the other). In a further aspect, this thermometer may be used to monitor the core temperature of the vessel while the vessel receives thermal energy from the sun (i.e., "charges") via the heat transfer plate.

In yet another aspect, considering that there is an insulative material between the exterior of the vessel and the interior of the case, once the vessel has reached the desired temperature, one or more handles may also be configured to be attached to the exterior of the case to allow a user to handle and transport the charged vessel and insulative case away from the parabolic reflector for immediate use, storage, or other such activities. Other designs and example embodiments are certainly possible.

Disclosed herein are devices, systems, and methods related to collecting, storing, and recovering thermal energy to allow numerous activities, which typically depend on fire and/or traditional fuel sources to be performed without such fuel sources (e.g., cooking). Specifically, disclosed herein are details of novel portable thermal energy heat-transfer and storage devices with an operating range between, for example, 150-600° C. (e.g., 300-400° C.), that can be heated, for example, with concentrated solar energy and can boil, bake, fry, and sear food for families with or without access to other energy source, as well as systems and methods directed at the same. In a further aspect, several components of the devices may be interchanged to customize how energy is collected, stored, and recovered to adapt to the desired user experience (e.g., substituting different phase change materials with different material properties to alter the cooking experience for the user).

And, although certainly not a limitation on the host of benefits provided by the devices, systems, and methods disclosed herein, a few of their key benefits are worth noting, including that in various embodiments they may enjoy one or more of the following benefits: (1) replace at least some of the current need for fires, thereby also removing the associated emissions or need for fuel; (2) improve portability of these technologies, as they can be used anyplace—indoors or outdoors—and no venting is required; (3) improve the timeframe for use as they can be used anytime—day or night—with no preheating or fire starters; (4) allow multiple uses for the same materials because the vessel is rechargeable (thus, the heat storage material can be reused a potentially unlimited number of cycles); (5) provide easy cultural adoption (e.g., in cooking applications, the invention can emulate current cultural cooking preferences, including a three-stone fire, baking oven, grill, komodo, tandoor, etc.); (6) improve scalability (as these devices can be sized for small or large families, multiple families, and institutional settings such as schools, hospitals, and restaurants, among other possibilities; (7) can be used in a dynamic range of varied applications (e.g., space heating, water purification, food drying, activities requiring electricity—through the use of thermoelectric generators and other devices—etc.); and (8) provide passive thermal energy collection, as opposed to requiring the procurement of firewood, coal, animal waste, or other fuel sources (often a common task for women in developing regions of the world), among other such possibilities.

FIG. 1 is a pair of schematic cross-sectional views of a portable, rechargeable vessel 100 for collecting, storing, and recovering thermal energy made up of a structure defining a well 101, here, a cylindrical structure having a side wall 102 and a bottom 104 and an open-top portion (i.e., at the top end of the side wall), and a thermally-conductive transfer plate 106 configured to interface with the open-top portion of the cylindrical structure. The well 101 contains a phase-change material 108, and one or more thermally-conductive fins 110 (here, three cylindrical fins) disposed in the phase change material 108.

In the illustrated embodiment the transfer plate 106 and the one or more fins 110 are made of a thermally-conductive material such as aluminum. While in certain embodiments, the structure defining the well (e.g., the side wall and bottom illustrated in FIG. 1) can likewise be made of a thermally-conductive material, in other embodiments, the structure defining the well may be made of a non-thermally-conductive material, such as a thermally insulative material. The structure defining the well is desirably made of a material that will withstand the temperatures achieved by the phase-change material during use. Accordingly, in certain embodiments, the structure defining the well is made of a metallic material, such as aluminum or steel. Other materials may be used, e.g., glass or heat-resistant plastic The materials used to form any of these components may also be fortified or improved through one or more processes (e.g., anodization) before implementation.

In the example embodiment illustrated by FIG. 1, a solid-walled cylindrical structure is shown with a side wall 102 and bottom 104, both of uniform thickness, and made of a common material, such as aluminum. The side wall 102 and bottom 104 may be made of a continuous piece of material (as shown in FIG. 1), but in other embodiments can be machined or manufactured as two separate pieces and joined together to form the structures illustrated in FIG. 1, for example, by welding. Furthermore, although the side wall 102 and bottom 104 are illustrated as having a uniform thickness in FIG. 1, they may be machined or manufactured to be different thicknesses (e.g., a thicker bottom and thinner side wall) depending on the design and/or the user's needs. Additionally, although both the side wall 102 and bottom 104 are illustrated in FIG. 1 as being made of a common material, it is possible that each could be made of different materials (e.g., aluminum and steel), different forms of the same thermally-conductive material (e.g., anodized and non-anodized aluminum), or different materials altogether (e.g., a heat-resistant plastic side wall and anodized aluminum bottom).

In certain embodiments as otherwise described herein, the side wall 102 and bottom 104 may differ in relative size than that which is illustrated in FIG. 1. Specifically, because the overall shape of the vessel illustrated in FIG. 1 is cylindrical, the relative proportions of the bottom and side wall may be described in the context of the bottom's radius (as it is circular) and the side wall's height. Mathematically, considering these variables, the volume of this cylindrical vessel may be described as follows: $V=\pi r^2 h$. In this regard, various volumes may be achieved through changing the height of the side wall relative to the radius of the bottom 104, the product of which may show improvement for various other components of the devices, methods, and systems described herein. For example, in some instances it may be advantageous to have the height of the side wall 102 approximately equal to the radius of the bottom 104 (as illustrated in FIG. 1); but in other instances it may be advantageous to have the height of the side wall 102 less or greater than the radius of the bottom 104.

As discussed above, the transfer plate 106 is made of a thermally-conductive material that allows for the exchange of heat in and out of the vessel shown in FIG. 1. In the example embodiment shown in FIG. 1, transfer plate 106 would receive thermal energy at the exterior of the rechargeable vessel 100 and conduct it through the fin(s) into the phase change material (i.e., during a "charging" operation); and emit stored thermal energy from the phase change material conducted by the fins to the transfer plate. While the transfer plate is shown in the drawings as being substantially flat, the person of ordinary skill in the art that different-shaped transfer plates can be used, e.g., to receive different workpieces to be heated by the transfer plate. For example, a transfer plate with a curved surface may be useful to heat a wok.

As described above, the heat transfer plate and the one or more fins are made from materials that are "thermally conductive." As used herein, a "thermally conductive" material has a thermal conductivity of at least 50 W/m·K at 25° C. Examples of suitable thermally-conductive materials include steel, aluminum, copper, and various metal alloys. In certain embodiments as otherwise described herein, the thermally-conductive material of the heat transfer plate and/or of the fin(s) is aluminum or an aluminum alloy. In certain embodiments as otherwise described herein, a thermally conductive material (e.g., of the fin(s), of the transfer plate, or both) has a thermal conductivity of at least 100 W/m·K, at least 150 W/m·K, or even at least 200 W/m·K at 25° C.

As described above, the heat transfer plate is in direct thermal contact with the one or more fins, such that heat can transfer between the fin(s) and the heat transfer plate. The person of ordinary skill in the art will appreciate that such direct thermal contact can be effectuated in a number of ways. For example, the heat transfer plate and the fin(s) can be formed from a single piece of material. Alternatively the heat transfer plate can be joined or welded to the fin(s) using a material that is itself thermally conductive, for example, a thermally-conductive solder.

As described above, the thermally-conductive heat transfer plate substantially covers the open-top structure at the top of the well. In certain desirable embodiments, the heat transfer plate is substantially sealed to the open-top of the structure, such that the well is substantially sealed thereby. Advantageously, this can prevent molten salt from spilling from outside of the vessel during transport, and can advantageously allow for the vessel to be used with the transfer plate facing downwards for charging, but facing upwards for cooking. In certain embodiments of the vessels as described herein, the well and the transfer plate form an air-tight seal. As described in more detail below, the transfer plate can be sealed to the vessel while the vessel is hot, e.g., at a relatively high operation temperature, such that the maximum pressure in the vessel during operation is not substantially higher than atmospheric pressure. In other embodiments, the thermally-conductive plate does not completely seal the open-top of the structure defining the well, but instead provides for a degree of venting of the volume of the well, e.g., to prevent pressure build-up during heating.

In FIG. 1, transfer plate 106 is shown as interfacing with the open top portion of the cylindrical structure made up of side wall 102 and bottom 104, and acting as a lid for the structure, but other examples of interfacing are certainly possible. Furthermore, although the transfer plate 106 is illustrated in FIG. 1 as being thinner than side wall 102 and bottom 104, it may be machined or manufactured to be different thicknesses (e.g., a uniform thickness as the bottom and side wall) depending on the design and/or the user's needs. Additionally, although the transfer plate 106, side wall 102, and bottom 104 of the device illustrated in FIG. 1 can be being made of a common thermally-conductive material, it is possible that each could be made of different thermally-conductive materials (e.g., aluminum versus copper or steel), different forms of the same thermally-conductive material (e.g., anodized versus non-anodized aluminum), or different materials altogether (e.g., an anodized aluminum transfer plate and a thermally resistant plastic side wall and bottom).

In certain embodiments, when the structure defining the well is formed at least in part from a thermally-conductive material, it can be, like the fin(s), in direct thermal contact with the transfer plate. For example, in the embodiment shown in FIG. 1, the side wall 102 can be made of a thermally-conductive material and be in direct thermal contact with the transfer plate. In such embodiments, the thermally-conductive material of the structure defining the well can also conduct heat between the transfer plate and the phase change material, and thus increase efficiency of the heat transfer. In such embodiments, it may be desirable to insulate the structure defining the well, either as part of the vessel or using a case surrounding the vessel as described below.

As described above, heat can be conducted into and stored by the phase change material through the heat transfer plate. In certain embodiments as otherwise described herein, the top surface of the transfer plate is a solar-absorbing material. A solar-absorbing material can help the transfer plate absorb more solar energy and thus conduct more solar energy into the phase change material. As used herein, a solar-absorbing material has a solar absorptivity of at least 0.5. In certain embodiments, the solar-absorbing material has a solar absorptivity of at least 0.65, or even at least 0.75. Desirably, the solar-absorbing material has a solar emissivity of no more than 0.5, for example, no more than 0.4 or even no more than 0.3. For example, a dark, opaque layer of solar-absorptive paint (such as SOLKOTE brand paint; many other solar-absorptive paints are commercially-available), or other such materials, may be provided at the exterior top of the transfer plate to increase the attraction and absorption of thermal energy from the sun to the transfer plate, and thereby the vessel itself.

As described above, a phase-change material is disposed within the well of the vessel. As used herein, a phase change material is a material that undergoes a change in phase at a temperature in the range of 110° C. to 700° C. The change in phase can be, for example, a change from solid to liquid (i.e., a melting). However, in other embodiments, the change in phase is a different change in phase, e.g., between two different solid forms. The change in phase can alternatively be a desolvation (e.g., a dehydration), with the material becoming desolvated when heated and solvated when allowed to cool. The specific heat of the phase change (e.g., a heat of fusion for a melting) is desirably at least 50, at least 100, or even at least 125 J/g. The phase change material desirably has a heat capacity (i.e., after the phase change) of at least 0.5, at least 1, or even at least 1.25 J/g·K.

The person of ordinary skill in the art will appreciate, based on the present disclosure, that many materials would be suitable for use as the phase change material, depending on the vessel's design and the user's needs. Specifically, in one embodiment, the phase-change material may be configured to change phase (e.g., melt or solidify) at a temperature in the range of 150-600 C, e.g., 150-400, or 200-600, or 200-500, or 200-400, or 300-600, or 300-500, or 300-400° C., which can emulate the typical cooking temperature range of an open fire. To achieve this range, or some subset portion thereof, a variety of materials, most commonly molten salts, are described herein.

In particular, a phase-change material suitable for use in the devices and methods described herein may be made of $KNO_3$ (potassium nitrate), $NaNO_3$ (sodium nitrate), or some combination of the two, depending on the desired operating range and/or user experience. For example, $NaNO_3$ has a similar operating range as $KNO_3$ and both are considered chemically stable until 450° C., at which point there is a higher probability of a reversible nitrate to nitrite reaction. Notably, because both $KNO_3$ and $NaNO_3$ are common materials used throughout the world as fertilizers, they are available at a low cost (under $1/kg). Again, however, depending on the desired operating range and/or user experience, a mixture of the two may also be advantageous—particularly in a sealed system as the mixture boils at a much higher temperature than either component separately and has a phase change is in the 200-300° C. range (depending on the mixture).

Of course, depending on the desired operating range and/or user experience, a variety of other molten inorganic salts can be used. For example, the phase change material may contain magnesium chloride, sodium chloride, potassium chloride, or some combination thereof, which function to alter any number of chemical properties of phase-change material (e.g., certain mixtures of the three operate at the in a higher desirable temperature range, having a melting point of about 380° C.). Examples of such desolvating materials include calcium chloride hexahydrate (dehydrates to calcium chloride upon addition of heat) and calcium hydroxide (dehydrates to calcium oxide upon addition of heat). And, other chemical compositions are certainly possible.

As described above, the phase change material is disposed in the well of the vessel, with the one or more fin(s) disposed therein. While it is not necessary to completely fill the well with the phase change material, it can be desirable to have the well be at least mostly filled with phase change material. For example, in certain embodiments as otherwise described herein, the phase change material fills at least 75%, at least 90%, or even at least 95% of the empty volume of the well (i.e., not taken up by the fins or by any other structure) at the lowest temperature at which the material is completely melted. Advantageously, the present inventors have developed a manufacturing method, described below, that involves sealing of the vessel while the phase change material is hot, so that minimal roof for material expansion is necessary in the sealed vessel. Of course, in some embodiments it will be desirable to leave some room for further expansion of the material.

The person of ordinary skill in the art will appreciate, based on the present disclosure, that many materials and designs would be suitable for use as the one or more fins, depending on the vessel's design, manufacturability, and the user's needs. Specifically, because they are in direct contact with the interior facing portion of the transfer plate 106, these fins allow the thermal energy incident on the exterior-facing portion of the thermally-conductive transfer plate 106 to be transferred effectively and efficiently to the interior of the portable vessel 100 because they are thermally conductive and are disposed in phase-change material 108.

Additionally, although fins 110 are illustrated in FIG. 1 as three concentric cylinders, other designs are certainly possible depending on the desired functionality of the fins 108, the transfer plate 106 with which they are in direct contact, or the overall functionality of the portable vessel 100. For example, these fins may be comprised of one or more thermally-conductive coils, one or more concentric thermally-conductive tubes, one or more plates, or other geometrical shapes of various shapes and sizes. Furthermore, although the fins 110 are illustrated as having a uniform thickness to one another in FIG. 1, they may be machined or manufactured to be different thicknesses (e.g., a thicker outer fin and two thinner interior fins), shapes (e.g., concentric cylinders versus squares), or configurations, depending on the design and/or the user's needs. The fin(s) can have openings formed therein to allow for convection of molten salt material.

In a further aspect, although the fins 110 are illustrated in FIG. 1 as having a different thickness than, side wall 102, bottom 104, and the transfer plate 106, they may be machined or manufactured to be various thicknesses (e.g., a uniform thickness as the transfer plate) depending on the design and/or the user's needs. The fin(s) can be made of, for example, steel, aluminum or an alloy thereof, copper, or another metal alloy. The fin(s) can be made, for example, from the same material as the material of the transfer plate and/or the material of the structure defining the well. However, in other embodiments, it may be desirable to use a material for the fins and for the transfer plate that is different from, e.g., more highly thermally conductive than, the material of the structure defining the well. For example, the structure defining the well can be made from steel or glass, and the transfer plate and fin(s) can be made from aluminum or copper. Similarly, in other desirable embodiments, the fin(s) are made from a different material than the materials of the transfer plate and of the structure defining the well. For example, the structure defining the well and the transfer plate can be made from aluminum, and the fin(s) can be made from copper.

The one or more fins desirably have a relatively high surface area relative to the volume of the well, so that they can efficiently transfer heat to and from the phase change material. For example, in certain embodiments as otherwise described herein, the surface area of the one or more fins is at least 25%, at least 50%, at least 100%, or even at least 125% of the interior surface area of the well (i.e., excluding the transfer plate).

While the vessel of FIG. 1 is cylindrical, the person of ordinary skill in the art will appreciate that the vessel may have a variety of shapes other than cylindrical. For example, the vessel may also or alternatively be made up of a structure that is more cuboidal, spherical, conical, or pyramidal, and so on. Furthermore, if employed, the relative dimensions, orientations, material makeup, and other such attributes of the vessel may be altered or arranged similarly to the examples discussed in the context of the cylindrical structure detailed above.

As described above, the structure defining the well can be disposed in an insulative case so that the vessel can be safely transported, and so that heat is better retained by a charged device until it is desired to be used. One embodiment of such an insulative case is shown in cross-sectional schematic view in FIG. 2. At FIG. 2, a portable, rechargeable vessel 200 similar to that of FIG. 1 is represented, with a transfer plate 206, side wall 202 (extending down to a bottom, also illustrated at FIG. 2), phase-change material 208, and fins 210 (in direct contact with transfer plate 206). Surrounding the vessel, however, is a insulative case 240, that is made up of a top portion 242 having one or more side walls (here, cylindrical side wall 244), a bottom portion 246 having one or more side walls (here, a cylindrical side wall) 248 and a closed bottom 249, and an insulative material 250 between the exterior of the bottom and side wall of the vessel and the interior of the bottom portion 246 and the top portion 242 of the case.

Figure 2:
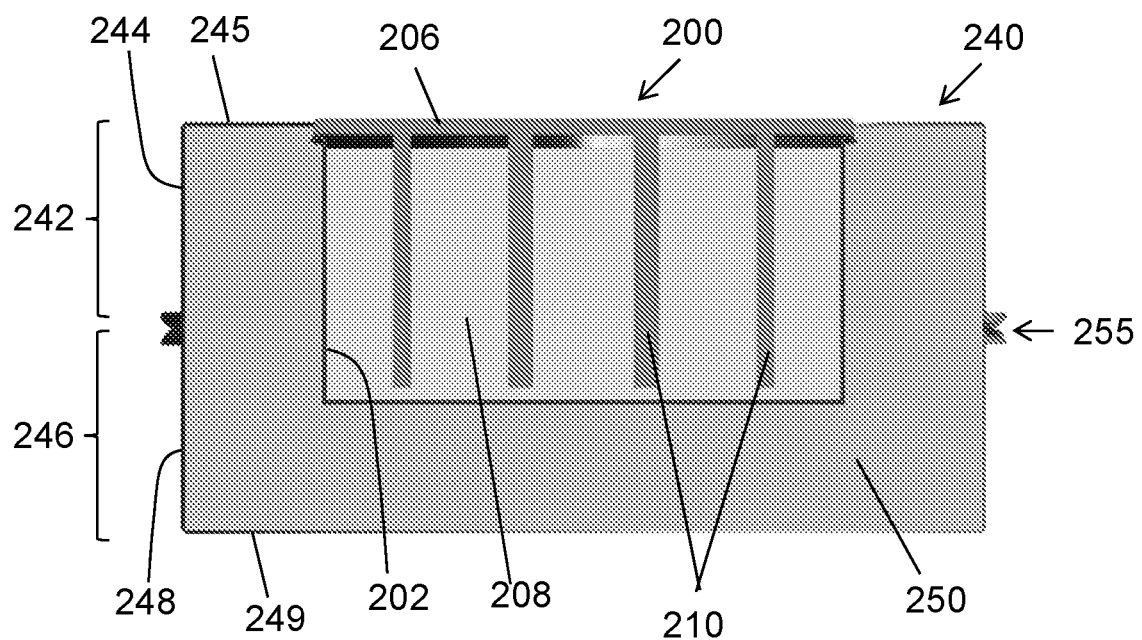
FIG. 2 is a simplified illustration of the vessel surrounded by a thermally-insulated material and substantially cylindrical case.

Further, in the embodiment shown in FIG. 2, at the interface of the top portion 242 and bottom portion 246 of the case, a lip 255 is illustrated. In a further aspect, although the top portion 210 and bottom portion 212 are shown as being two separate pieces interfacing with one another at the lip, it is possible that they may be made of a continuous piece of material, or machined or manufactured as two separate pieces and then joined together (permanently or otherwise) to form a top portion and a bottom portion. There need be no line of demarcation between the top portion and the bottom portion of the case.

In certain embodiments as otherwise described herein, the case can include an opening at the top of the top portion (i.e., a "semi-open top"), with the opening being configured to allow access to the transfer plate. In the system of FIG. 2, the top portion of the case has a top surface 245, which has an opening formed therein to allow access to the transfer plate. The opening is desirably configured such that at least 75%, at least 85%, or even at least 95% of the surface of the transfer plate is accessible.

In the example embodiment illustrated by FIG. 2, a solid-walled substantially cylindrical case is shown with a top portion 242, with a side wall and semi-open top that is approximately equal to the shape and circumference of the transfer plate 206, and bottom portion 246, both of uniform thickness.

Furthermore, although the top portion 242 and bottom portion 246 are illustrated as having a uniform thickness in FIG. 2, they may be machined or manufactured to be different thicknesses (e.g., a thicker bottom portion and thinner top portion) depending on the design and/or the user's needs.

Additionally, although the top portion 242 illustrated in FIG. 2 shows a semi-open top that is approximately the same shape and circumference as the transfer plate 206, other configurations are certainly plausible. For example, the semi-open top portion 242 illustrated in FIG. 2 could be approximately the same shape but of a slightly larger circumference than the transfer plate 206 to avoid, among other things, and thermal energy being transferred between the transfer plate and the top portion by direct contact or otherwise.

FIG. 2 illustrates a thermally-insulative material 250 between the exterior of the bottom and side wall of the vessel and the interior of the bottom and side wall of the case. Although this thermally-insulative material is illustrated as continuous material throughout the interior of the case (e.g., an insulative foam or liquid), other examples are certainly possible—and may even be preferred depending on the design and/or the user's needs. For example, instead of a continuous material, a thermally-insulative material may be made up of one or more layers of solid (or substantially solid) insulative material. In one example, thermally-insulative material 214 may be made up of high-performance aerogel blanket insulation, such as Pyrogel XTE, which is used in high-temperature industrial applications around the world and may improve the overall structural integrity and/or performance of the system. Additionally, it is also possible, and may even be preferred, to use multiple layers of a chosen thermally-insulative material (such as the high-performance aerogel blanket insulation described above) or multiple thermally-insulative materials in combination with one another (e.g., a layer of high-performance aerogel blanket insulation and an insulative foam). Other thermally-insulative materials and combinations thereof are certainly possible.

The thermally-insulative material desirably has a thermal conductivity value of no more than 1 W/m·K at 25° C., e.g., no more than 0.5 W/m·K or even no more than 0.1 W/m·K at 25° C. Moreover, the thermally-insulative material is desirably configured such that, when the well is filled with molten potassium nitrate at 350° C., the molten salt does not fall below a temperature of 320° C. for at least five hours (e.g., when a lid of the device is disposed on top of the transfer plate).

In yet a further aspect, at the interface of the top portion 242 and bottom portion 246 of the case, a lip 255 is illustrated in FIG. 2, which may present a number of advantages. Specifically, in one aspect, the presence of protrusions around and at the interface of the top portion 242 and bottom portion 246 (collectively, here, the lip) may improve the interconnectivity of the two (as it allows for a greater surface area at which the two can meet), among other structural benefits. Additionally, these protrusions, which form lip 255, may present a structure at which to reinforce the integrity of case 240, without having to breach or otherwise alter the side wall or semi-open top of the top portion or the side wall or closed bottom of the bottom portion.

Figure 3:
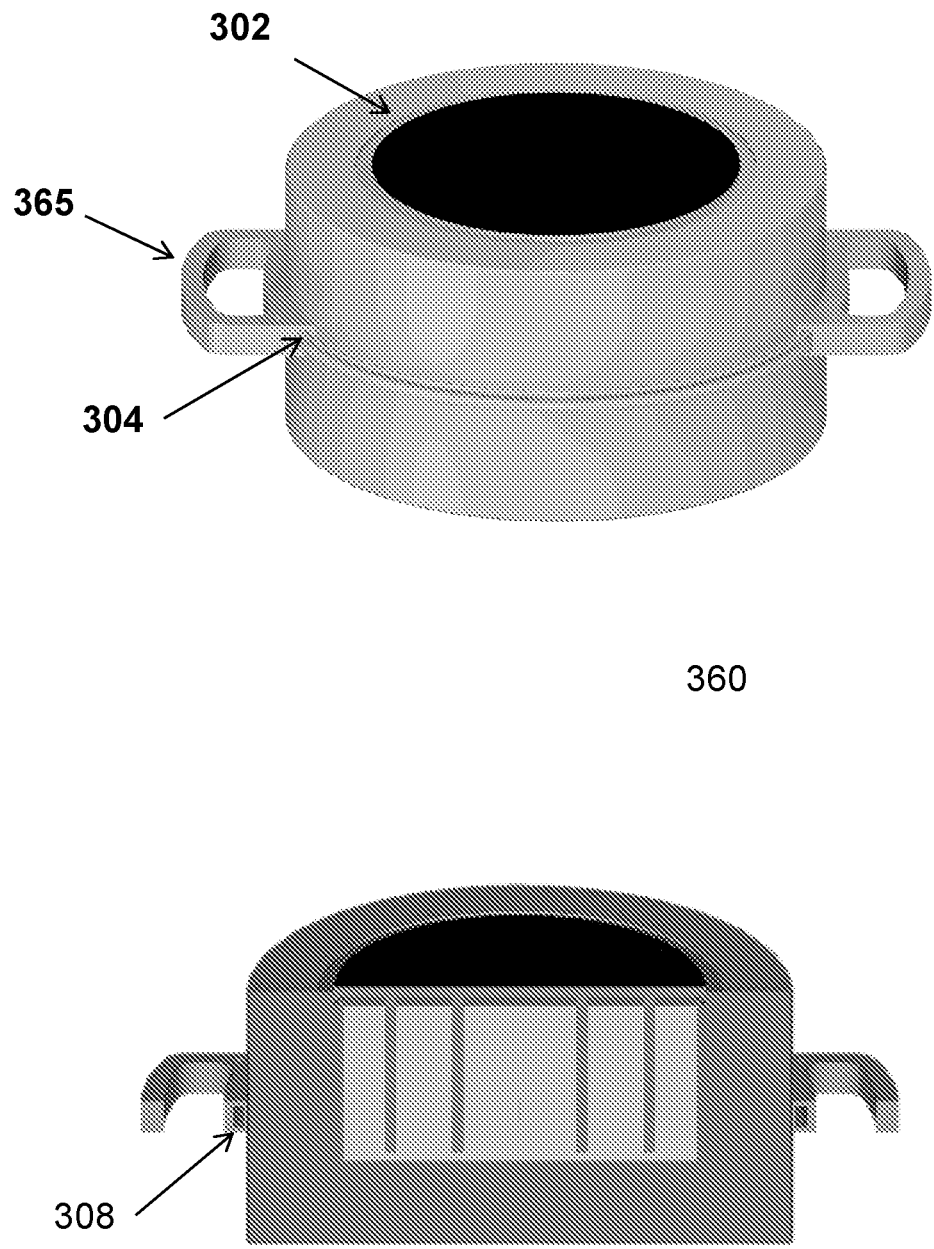
FIG. 3 is a simplified illustration (and a cross-sectional view of the same illustration) of a heat-transfer device.

Specifically, in one example, FIG. 3 presents schematic perspective and cross-sectional views of a heat-transfer device 360 comprising a portable, rechargeable vessel with an absorptive layer 307 added to the exterior facing portion of the transfer plate and handles 365 added to the case 340 surrounding the thermally-insulated material and the vessel. In this example embodiment, two handles 365 are attached to each side of the case by clamping them to each side of the protrusions around and at the interface of the top portion and bottom portion of the case. In a further aspect, this clamping may be accomplished by a variety of means.

For example, each handle 365 may be manufactured as two almost identical halves, one of which may have a channel formed therein so that the handle half interfaces with the protrusion of the top portion of the case and the other may have a channel formed therein so that it interfaces with the protrusion of the bottom portion of the case, as illustrated at 304 and 308. In a further aspect, one handle half could be tapped to receive two threaded bolts on opposing sides of the handle, whereas the other handle half could have two openings configured to receive the two threaded bolts, but not allow the heads of the bolts to pass through, thereby allowing for the two handle halves to be combined and secured by inserting, threading, and tightening the two bolts. It is certainly possible however, that different configurations could be designed to accomplish a similar interfacing and securing of the top and bottom portions of the case via the protrusions of the same, while also allowing for the addition of functional handles to the case. And of course, the case may be provided with one or more handles in any desirable configuration other than that particularly described above.

In a further aspect, although not illustrated at FIG. 3 (see FIG. 6, at 604 for further disclosure), the heat transfer device 300 may be further configured to include a thermometer (e.g., a thermocouple) in thermal contact with the phase change material. In one example, a wired connection could be implemented to carry the signal from the thermocouple at the core of the vessel to the exterior of the case. In another example, this information could be communicated by a device at the core of the vessel to the exterior of the case via a wireless interface designed to provide for communication under one or more wireless communication protocols (e.g., Bluetooth, WiFi, Long-Term Evolution (LTE), a radio-frequency ID (RFID) protocol, near-field communication (NFC), and/or other wireless communication protocols). Regardless the means of communication, however, the information gained form a thermometer at the vessel's core (or somewhere else within the vessel) may be used to monitor the core temperature of the vessel while the vessel receives thermal energy from the sun (i.e., "charges") via the heat transfer plate.

Additionally, although not illustrated in FIG. 2, the overall structure of this case may be comprised of one or more shapes other than that which is substantially cylindrical. For example, the case may also or alternatively be made up of a structure that is substantially cuboidal, spherical, conical, or pyramidal, and so on. Furthermore, if employed, the relative dimensions, orientations, material makeup, and other such attributes of the case may be altered or arranged similarly to the examples discussed in the context of the substantially cylindrical structure detailed above.

Figure 4:
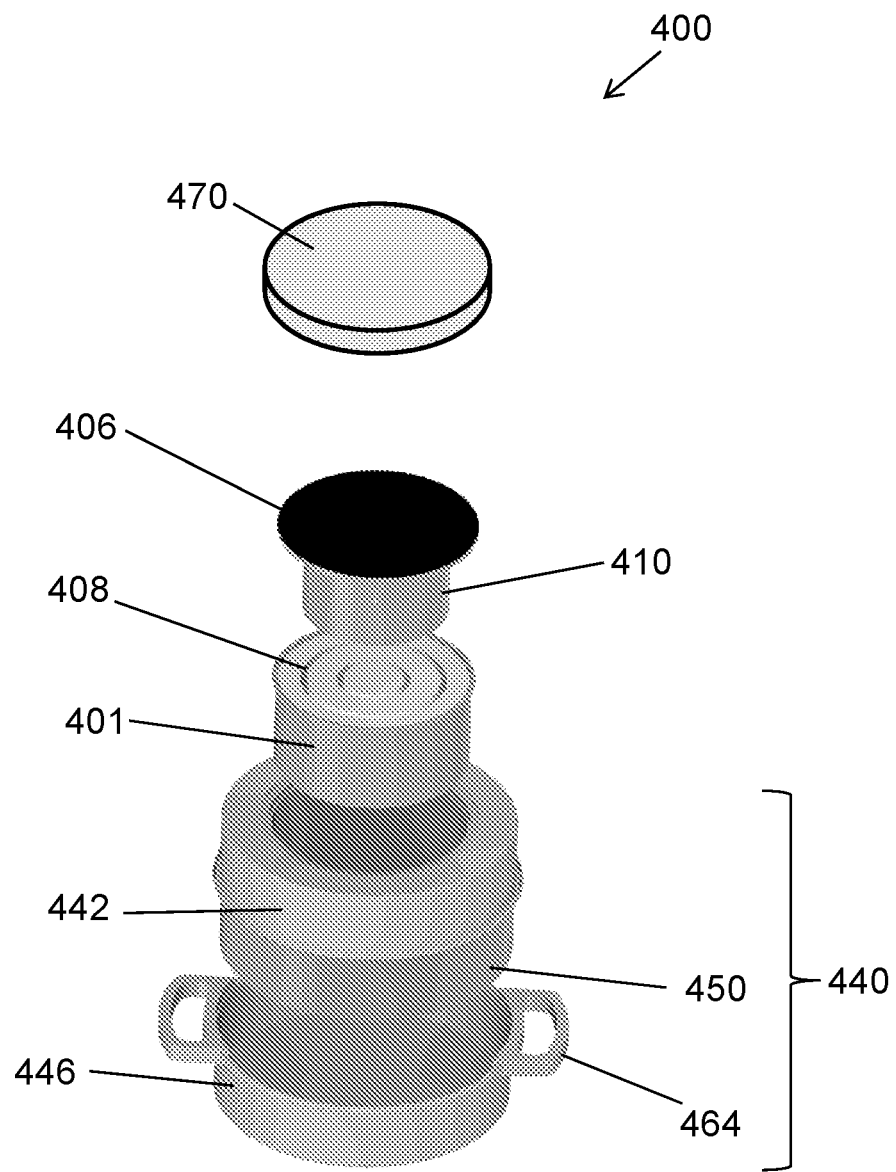
FIG. 4 depicts an expanded rendering of the components comprising the device depicted in FIG. 3.

At FIG. 4 an expanded rendering of the components comprising the device depicted in FIG. 3 are shown. Specifically, device 400 shows a transfer plate 406 (with an absorptive layer added to the exterior facing portion), connected to fins 410. The phase-change material 408 is shown with recesses to allow the insertion of fins 410; the person of ordinary skill in the art will appreciate that the phase change material can be provided to the vessel during fabrication as a granular solid or in any other form, i.e., there is no need to pre-form the phase change material with such recesses. The fins 410 and the phase-change material 408 are contained in cylindrical structure defining a well 401 (with a side wall extending down to a bottom), which is in turn disposed in an insulative case 440 comprising a top portion 442, thermally-insulative materials 450, a bottom portion 446, and handles 464 configured to attach at the interfacing protrusions of the top portion 442 and bottom portion 446 of the case.

FIG. 4 also shows a lid (or cover) 470, which can be configured to cover the transfer plate when the vessel is not being charged or discharged. As the person of ordinary skill in the art will appreciate, such a lid can be configured to simply sit over the top of the vessel, or alternatively can be configured to be held on the vessel using any number of structures such as straps, belts, snaps, latches, or elastic materials. The lid can be configured to insulate the transfer plate, as described in more detail below.

Figure 5:
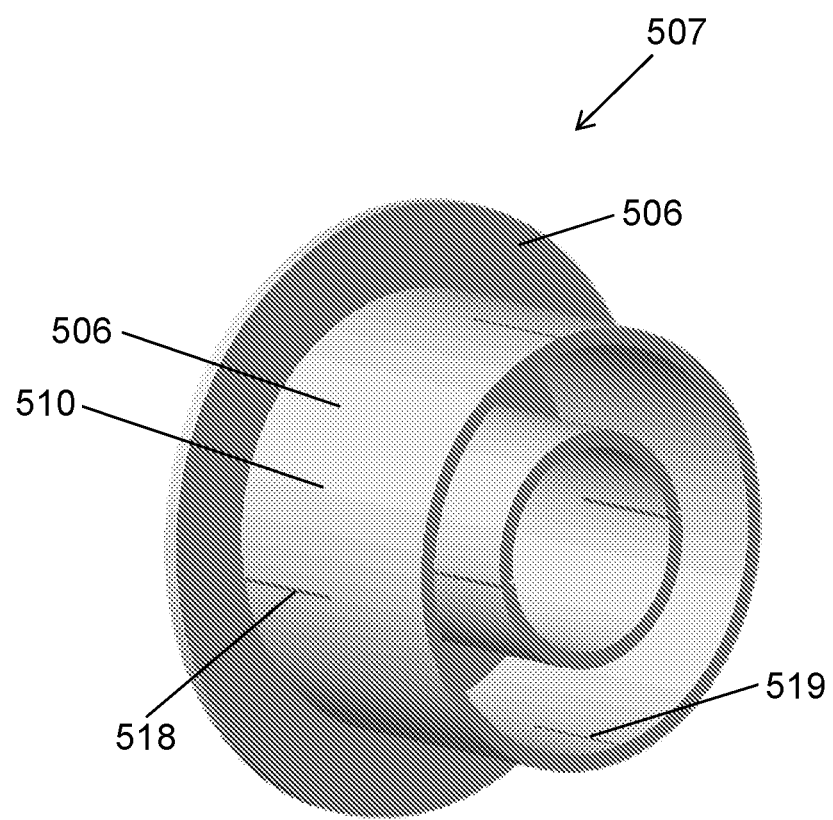
FIG. 5 depicts slots cut into fins attached to the transfer plate of the vessel, according to an example embodiment.

In certain embodiments, each of one or more of the fins has one or more slots (e.g., substantially vertical) formed therein, either at the interface between the fin and the transfer plate, the end of the fin remote from the transfer plate, or both. Turning to FIG. 5, an example embodiment is shown depicting slots cut into two fins attached to a transfer plate. Specifically, FIG. 5 depicts two fins (the larger of which is indicated by reference numeral 510) attached to a transfer plate 506 (collectively, transfer unit 507), with four slots cut in each fin (those for the larger fin 510 identified by reference numerals 518 and 519). In a further aspect, as illustrated in FIG. 5, two slots 518 are cut beginning from the interface of fin 510 and transfer plate 506, while the other two slots 519 are cut beginning from the opposing edge of fin 510 (which, for reference, would be the edge inserted in the phase-change material). In the embodiment of FIG. 5, there are two of each kind of slot, spaced around the circumference of the fin. Of course, the person of ordinary skill in the art will appreciate that other configurations can be useful.

Although not immediately apparent, these slots provide a number of advantages for some of the example embodiments described herein. Specifically, in the context of assembling the portable, rechargeable vessel described herein, the slots shown at the top (518) and the bottom (519) of each of the concentric fins, create a channel for air to escape when the transfer unit 500 is inserted into a molten phase change material—thereby allowing for more efficient assembly, as well as a higher integrity assembled vessel.

In a further aspect, when the vessel is charged by solar thermal energy or otherwise, and the phase-change material contained therein transitions to a molten, liquid phase, the slots allow for the movement and increased fluidity of the phase-change material around and between portions of the vessel—thereby allowing for more efficient energy exchange, as well as a higher integrity assembled vessel. As described above, other types of holes formed through the fins can also provide this benefit.

Advantageously, the vessel can be made to be portable, so that it can be conveniently moved from a charging station to. In certain embodiments, the vessel (including at least the structure defining the well, the one or more fins, the transfer plate, and the phase change material, and, in certain embodiments, including the insulative case) is no more than 100 kg in mass, no more than 175 kg in mass, no more than 50 kg in mass, or even no more than 40 kg in mass.

Other aspects of the disclosure relate to methods for making a vessel as described herein. Because the vessel is typically operated at high temperatures (e.g., 300-400° C.) the components often expand, contract, or otherwise change, which can lead to structural flaws over time (e.g., leaking phase-change materials), among other defects.

In one aspect, the disclosure provides a method for making a vessel as described herein, the method including providing a transfer unit comprising a transfer plate and one or more fins extending from a surface thereof; providing a structure defining a well, the well having a phase change material disposed therein; disposing the transfer plate at the open top of the well such that the fins are disposed in the phase change material; and, while the phase change material is at a temperature of at least 120° C., sealing the transfer plate to the structure defining the well. The sealing can, for example, make an air-tight seal.

The present inventors have determined that sealing the transfer plate to the structure defining the well while the phase change material is at an elevated temperature can provide a number of benefits, especially with respect to improving its structural integrity and improving its longevity and effective use. Sealing at an elevated temperature can ensure that the device is sealed at or near a maximum use temperature of the device, such that pressure does not build up in the device during use. When the vessel cools, a partial vacuum can be formed (i.e., similar to a vacuum canning process), but the materials can be selected to handle this partial vacuum.

A variety of elevated temperatures can be used in such embodiments of the methods described herein. The phase change material can be, for example, at a temperature of at least 150° C., at least 200° C., or even at least 300° C. while the transfer plate is sealed to the structure defining the well. In certain embodiments, the phase change material is in a molten state while the transfer plate is sealed to the structure defining the well. In certain embodiments, it can be desirable to have the phase change material within 30° C., within 20° C., or even with 10° C. of its maximum thermal operating point (typically, the boiling point of the phase-change material, or a preset maximum thermal operating point, for example 401° C., depending on the design or user's needs)

Two example methods of fabrication and assembly are detailed in accordance with example embodiments.

In the first example embodiment, one or more slots may be cut extending from the top or the bottom of each fin (e.g., as shown in FIG. 5) and attached to the interior-facing portion of the transfer plate (i.e., the "bottom" of the transfer plate).

Then, the phase-change material in the cylindrical structure may be heated, approximately, to a temperature of at least 120° C., or some other temperature as described above. The fins may be inserted into the phase-change material until the transfer plate interfaces with the open-top portion of the cylindrical structure. Again, as relevant here, the slots described in FIG. 5 create a channel through which air may escape when the fins are inserted into the molten phase-change material, as well as allowing the molten phase-change material to move between the inserted fins as well. After this interfacing, in order to seal the vessel, the perimeter of the heat transfer plate may be sealed (e.g., welded) at its interface with the cylindrical structure, while the phase change material is at the elevated temperature. Finally, after the welding is complete, the vessel may be allowed to cool (to room temperature or some other preset temperature).

In a second example embodiment, one or more slots may be cut extending from the top or the bottom of each fin (e.g., at 180 degrees separation, as shown in FIG. 5, at 506 and 508) and attached to the interior-facing portion of the transfer plate (i.e., the "bottom" of the transfer plate). Then, the phase-change material in the cylindrical structure may be heated to the temperature, approximately, at which the phase-change material becomes a liquid, but still well below its maximum thermal operating point. In a further aspect, at the point the phase-change material is heated to its molten, liquid phase, the fins may be inserted into the phase-change material until the transfer plate interfaces with the open-top portion of the cylindrical structure. Again, the slots described in FIG. 5 create a channel through which air may escape when the fins are inserted into the molten phase-change material, as well as allowing the molten phase-change material to move between the inserted fins as well. After this interfacing, in order to seal the vessel, the perimeter of the heat transfer plate may be welded at its interface with the cylindrical structure.

In the embodiments described above, final sealing of the transfer plate is performed at the same time it is attached to the structure defining the well. In certain embodiments of the fabrication methods described herein, the final sealing of the transfer plate is performed after attachment. The attachment can be performed while the phase change material is at any desired temperature, e.g., at an elevated temperature as described above. The attachment can be performed to only partially seal the transfer plate to the structure defining the well; with the final sealing being performed to complete the seal. Alternatively, the attachment can be performed to completely seal the transfer plate to the structure defining the well; the seal can be broken, e.g., by forming a hole in the vessel (e.g., in the weld joining the transfer plate to the structure defining the well), then that hole resealed to complete the final seal. The final sealing can be performed at a temperature that is higher than the temperature at which the initial attachment is performed. For example, the final sealing can be performed at a temperature that is at least 20°

C. higher, 30° C. higher or even 40° C. higher than the temperature at which the initial attachment is performed. Depending on the particular materials, the temperature of the final sealing can be, for example, at least 200° C., or even at least 300° C. while the transfer plate is sealed to the structure defining the well. In certain embodiments, the phase change material is in a molten state while the final seal is made. In certain embodiments, it can be desirable to have the phase change material within 30° C., within 20° C., or even with 10° C. of its maximum thermal operating point (typically, the boiling point of the phase-change material, or a preset maximum thermal operating point, for example 401° C., depending on the design or user's needs) when the file seal is made.

Specifically, in accordance with one such embodiment, after welding the transfer plate to the structure defining the well, a hole may be drilled into the weld at the interface of the transfer plate and the structure defining the well, and the vessel may be heated to an elevated temperature, e.g., to its maximum thermal operating point (typically, the boiling point of the phase-change material, or a preset maximum thermal operating point, for example 401 degree Celsius, depending on the design or user's needs). Then, at the elevated temperature, the vessel may be re-welded at the point where the hole was drilled and allowed to cool (to room temperature or some other preset temperature).

Additionally, although pursuing these methods of vessel fabrication and assembly may yield several improvements for the structural integrity of the vessel and further ensure its longevity and effective use, two benefits are worth noting: the prevention of the vessel's deformation under normal heating cycles and the reduced risk of over-pressurizing the vessel. Further, these improvements may also reduce the risk of phase-change material leakage through structural defects in the vessel, thereby increasing the efficiency of the collection, storage, and recovery of solar thermal energy, as well improving safety for the user.

Another aspect of the disclosure is a system for collecting and storing thermal energy. The system includes a source of thermal energy, and a vessel as described herein, disposed such that its thermally conductive heat-transfer plate is operatively coupled to the source of thermal energy.

A related aspect of the disclosure is a method for collecting and storing thermal energy. The method includes providing a source of thermal energy, operatively coupling the heat transfer plate of the vessel to the source of thermal energy, and transferring heat from the source of thermal energy through the heat transfer plate and to the phase change material, such that the phase change material changes phase. The method can further include removing the vessel from the source of thermal energy, and, optionally, covering the transfer plate with a lid. The method can further include storing the vessel for at least 2 hours, at least 4 hours, or even at least 6 hours before use.

In the systems and methods for collecting and storing thermal energy of the disclosure, the source of thermal energy can take many forms. The source of thermal energy can be, for example, as a source of concentrated solar radiation, such as a curved (e.g., parabolic) reflector or a lens (e.g., a Fresnel lens), with transfer plate being disposed substantially at the focal point thereof. Of course, in another embodiment, the source of thermal energy is a heater powered by photovoltaic cells. And, in yet another aspect, a user may also effectively harvest thermal energy from sources other than the sun. For example, a user may harvest thermal energy by placing the transfer plate of the thermally-encased portable vessel in thermally-conductive contact with one or more heat sources that create and expel heat as a by-product of another desired result (e.g., heat from an engine, heat from combustion, or heat from another process, and so on), which may otherwise go uncaptured and unused. Other examples are certainly possible.

Figure 6:
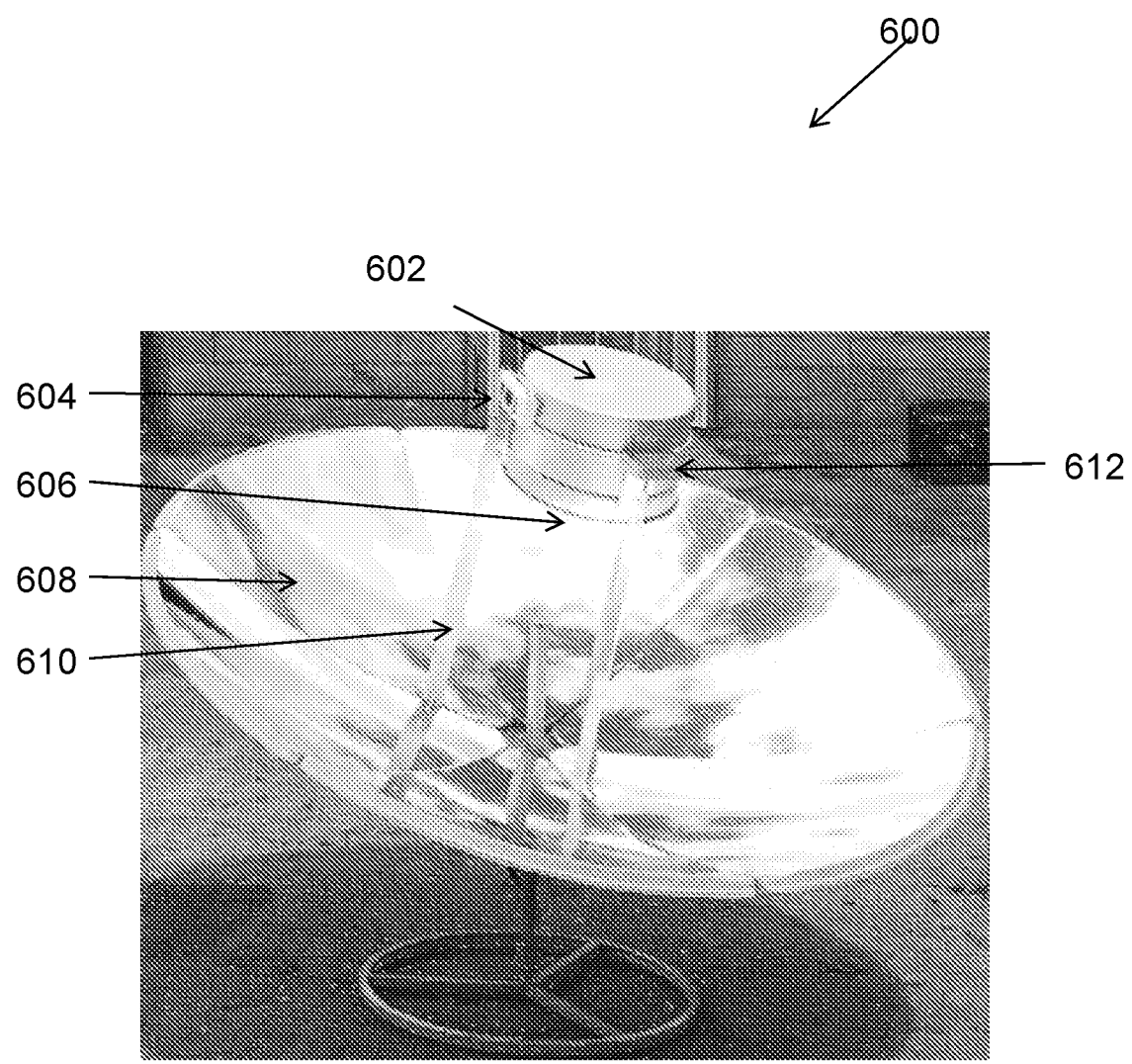
FIG. 6 depicts a system for collecting solar thermal energy in the vessel from a parabolic reflector and stand configured to focus sunlight on the transfer plate of the vessel.

FIG. 6 depicts an example of a system for collecting (and monitoring the collection of) thermal energy with a heat-transfer device by aiming the transfer plate of a portable, rechargeable vessel at a device configured to focus sunlight a specific point. Specifically, at FIG. 6, a heat-transfer device 602 (such as those described in the context of at least FIGS. 3 and 4) containing a vessel and aiming the vessel's transfer plate at the focal point of a parabolic reflector (illustrated, approximately, at 606). In this example embodiment, a number of additional details are also disclosed, including: a temperature sensor 604 in communication with a thermocouple at the vessel's core; a stand 610 configured to hold the heat-transfer device 602 such that the transfer plate of the vessel contained therein is directed, approximately, at the focal point of a parabolic reflector 608; and a set of handles 612 allowing a user to remove the heat-transfer device 602 from the stand 610.

Accordingly, in an example embodiment according to the system illustrated in FIG. 6, allows a user attempting to collect, store, and recover thermal heat energy in heat-transfer device 602 to do so by: (1) placing the device in stand 610 such that the transfer plate is at the focal point of the parabolic reflector; (2) monitoring the core temperature of vessel via an associated temperature sensor 604; and (3) once the vessel has reached a sufficient temperature for the user's needs or desires, removing the device with the associated handles 612.

Additionally, although not illustrated in FIG. 6, other lenses and solar concentrators may be used in a similar fashion (e.g., placing the transfer plate of the vessel at the center of a Fresnel lens focal point). In other examples, a user may harvest thermal energy from the sun by placing the transfer plate of the thermally-encased portable vessel in contact with an electrical heater configured to receive electrical energy from one or more photovoltaic cells.

In a further aspect, to accommodate various operating parameters (e.g., increased internal temperatures, charging rates, etc.), different or additional components illustrated in FIG. 6 may be added to the system (e.g., bigger parabolic reflectors to reduce the amount of required charging time and/or the need to track the movement of the sun to ensure effective solar concentration). In fact, in general, it should be well understood that the entire system, and any component thereof, may be scaled larger or smaller to fit various applications and/or needs (e.g., single-family cooking versus institutional-scale production).

Furthermore, although manual tracking of the movement of the sun across the sky by manually adjusting the position of the parabolic reflector 608 (e.g., every 15-20 minutes) may increase the efficiency of the system detailed in FIG. 6, automated tracking is also certainly possible, and may be easily employed in the systems described herein.

In a further aspect, facilitating the storage of the solar thermal energy collected by the system may be accomplished by a variety of means. For example, the entire heat-transfer device 602 may be placed in an insulative container until recovery is desired. In another example, a thermally-insulative, substantially flat, lid configured to interface with the opening of the top portion of the case and further encapsulate the cylindrical structure is possible, thereby allowing the case to further insulate the cylindrical structure.

Further, once the user determines the solar thermal energy collected (and potentially stored) in accordance with the system detailed in FIG. 6, recovery is simple, efficient, and intuitive. For example, if the user decides to cook some eggs using the collected solar thermal energy from the parabolic reflector 608, assuming a sufficient internal temperature of the vessel, the user may grab handles 612 and turn the heat-transfer device 602 upright, place thermally-conductive cookware on the transfer plate of the vessel, place the eggs in the pan, and cook them until his or her desired consistency. Other cooking applications are certainly possible.

Further, although the cooking possibilities presented by the system disclosed in FIG. 6 provide a host of attractive applications of the heat-transfer device 602, they should not be interpreted as limiting as the devices, systems, and methods disclosed herein provide for a host of dynamic and varied additional applications, including: space heating, water purification, food drying, and activities requiring the use of thermoelectric generators and other devices. Other such applications are certainly possible.

Accordingly, another aspect of the disclosure is a method for recovering thermal energy from a vessel as described herein in which the phase change material is at an elevated temperature. The vessel can be charged to an elevated temperature, e.g., by causing the phase change material to change phase as described above. The method can include heating a workpiece via heat transfer from the phase change material through the transfer plate. The workpiece can be heated, for example, by being disposed in contact with the transfer plate, or by being placed in proximity to the transfer plate, e.g., in the same closed space as the vessel (such as a room or an oven).

The vessels described herein can be especially useful in cooking applications. For example, the workpiece can be a cooking vessel, such as a pot or a pan or a griddle. Alternatively, the workpiece can be a foodstuff, cooked by being disposed on the transfer plate or by being placed near the transfer plate. In alternative cooking embodiments, the transfer plate is used as a radiant heat source for an oven or a drying apparatus. But the person of ordinary skill in the art will appreciate that the vessels and methods described herein can provide heat to a number of additional uses. Accordingly, the workpiece to be heated by the vessel can include a thermoelectric generator, a still, or an enclosed space such as a room.

Accordingly, in certain embodiments as described herein, the present disclosure provides a portable, rechargeable device that can collect, store and recover solar or other thermal energy for a variety of uses, including cooking, space heating, drying and electricity generation. In various embodiments, the systems and methods provided herein can collect, store, and recover solar thermal energy to allow cooking without fuel, flame, or emissions. Formerly, solar cooking devices only worked when the sun was shining, which forced cooks—normally women—to attend to meal preparation during the day and outside, and consequently, adoption rates of solar cookers have been low. Many cooks choose to buy or collect solid fuels like firewood or charcoal, even if the cost of fuel represents a substantial percentage of household income.

Features and benefits of various embodiments of the disclosure include one or more of:
1. Replaces fires: no fuel, combustion, or emissions
2. Portable: can be used anyplace—indoors or outdoors—and no venting is needed
3. Can be used anytime—day or night—with no preheating or fire starters
4. Rechargeable: the heat storage material can be reused an unlimited number of cycles
5. Easy adoption. For example, in cooking applications, the invention can emulate current cultural cooking cultures, including a three-stone fire, baking oven, grill, komodo, tandoor, etc.
6. Scalable—can be sized for small or large families, multiple families, and institutional settings like schools, hospitals, and restaurants
7. Enables several applications, like space heating, cooling, lighting, water purification, food drying, cell phone charging, and general electricity generation
8. Efficient, minimal waste or losses
9. Valuable—high utility/cost
10. Provides an alternative to collection of firewood and animal waste, a common task for women in developing regions of the world. Instead, the device creates the opportunity for women to operate solar harvesting businesses that collect, store, and deliver energy vessels.

In various embodiments, the disclosure provides a sealed vessel that can be used to collect, store, and then recover thermal energy for applications like cooking. Such a sealed vessel can in certain embodiments be provided as a solid, sealed vessel (e.g., a cylinder) insulated on all sides. To collect energy, any insulation (e.g., an insulating lid) on one end of the vessel can be removed, and heat can be applied to a transfer plate (e.g., formed from metal) at that end of the vessel, for example by using a parabolic solar concentrating dish. The contents inside the vessel warm and change phase (e.g., from solid to liquid), and thereby store large quantities of thermal energy. For storage, the exposed end of the vessel can be insulated (e.g., by placement of the lid), and the heat energy can be retained for several hours. To recover the energy, the insulation at the is removed, exposing the hot metal plate, which can be immediately used like a hot plate for cooking, space heating, water purification, drying, and electricity generation via a thermoelectric generator.

Various embodiments of the systems and methods described herein provide a user with the ability to store and transport solar thermal energy on a household scale, allowing cooking when and where desired, including at night and inside. Solar energy is concentrated and collected at high temperatures during the daytime in insulated vessels that contain thermal storage materials, like salts that become molten upon heating. Since solar energy is concentrated during collection, high storage temperatures are obtained, for example, on the order of 300-400 C, thus making the cooking experience similar to and competitive with fire-based cooking. The systems and methods described herein can use solid-liquid phase change materials to store large amounts of energy in relatively small and transportable vessels. The technology is transformative because it closely approximates combustion-based cooking allowing simulation of a wide variety of cooking cultures, and thereby respecting social and cultural preferences and increasing the probability of adoption by a large number of users. Thermal storage has been labeled the holy grail of solar cooking. Solar cooking offers the advantages of free abundant fuel that is available in many locations, using no fire/flame, and resulting in no emissions. Despite the promise of solar cooking, the inability to store and transport solar energy in a cost-effective way has limited the use of solar for cooking to a relatively small number of enthusiasts who have the flexibility to attend to cooking while the sun is shining. The present disclosure provides a set of solutions that can accommodate a variety of configurations to fit different applications and cultures. Also, developed regions of the world can benefit from the systems and methods of the disclosure, with applications in parks, disaster situations, and potentially for residential and commercial cooking.

In certain embodiments, the disclosure provides a vessel that can collect solar energy via transfer of concentrated solar radiation through a heat transfer plate and into a sealed compartment containing a material that can store large amounts of heat energy, e.g., a salt that melts from solid to liquid and stores large quantities of energy in the phase transition (and releases it during recovery). The vessel can be insulated on all sides with removable insulation at the heat transfer plate surface. After charging the vessel, i.e., heating it until the salt has melted, the insulated cover is placed on the heat transfer surface and the vessel is stored and can be moved to the cooking site. To cook, the insulation is removed, and cooking can occur immediately, directly on the transfer plate, or a cooking pot or pan can be placed on the hot surface. Energy is recovered by transferring heat from the vessel to the food, and as heat is transferred the vessel cools and the energy storage material transitions back from a liquid to a solid. Cylindrical aluminum tubing can serve as heat transfer fins to accelerate the energy transfer from the container to the cooking surface/heat transfer plate. For situations that require lower heat transfer rates and/or lower cooking temperatures, a spacer rack/grill, metal plate, or slotted cover with adjustable openings is used to regulate heat flow. When cooking is complete, the cover can be replaced to retain the remaining heat energy. Once the energy has been used, the vessel can returned to the charging location, and the cycle can be repeated. There does not seem to be a limit to the number of times that the energy storage material can go through heat-storage-recovery cycle.

The present inventors have used commercially available parabolic reflectors to concentrate solar radiation on the bottom of vessels (metal pans) containing various salts and salt mixtures. In pilot tests the heat transfer surface on the bottom of the vessels often reached temperatures above 700° C., and the salts readily melted—changing from the solid to liquid phase—thereby storing large amounts of thermal energy. A variety of dish reflectors and salt/vessel configurations have been used, generally allowing the collection of about 15-20 MJ per day per reflector dish in the central United States using ~1-1.5 m diameter dishes. One strength of the devices and methods described herein is that if higher temperatures are desired, the concentration ratio of the solar radiation can be increased (e.g., by use of a larger dish). Similarly, if increased capacity is desired, more or larger reflector dishes can be added. In fact, the entire system can be scaled larger or smaller to fit various applications, from single family cooking to institutional scale production. While the inventors' experiments were performed by manually tracking the movement of the sun across the sky by adjusting the position of the dishes every 15-20 minutes, automated tracking is within the skill of the ordinary artisan (although it can complicate the system, increase the level of maintenance necessary, and increased cost).

The present inventors have stored thermal energy in prototype vessels and monitored the storage by (a) measuring changes in temperature inside the vessel with time and (b) conducting cooking tests after storage. Molten salts and salt mixtures have been stored in pans insulated with mineral wool. The energy storage devices retained heat and maintained temperatures above the melting temperature of the molten salt—in a range of 300-400° C.—for 3-4 hours. Even though this was a crude device with an unsophisticated insulation system, the storage temperature was maintained above 100° C. for over 10 hours. The present inventors have designed and tested an improved insulation system using aerogel insulation, and stored molten salts above the phase change temperature for over 5 hours, and maintained storage temperatures above 100° C. for over 12 hours. The present inventors have also developed a double wall, vacuum insulated vessel with radiation shields between the walls and an insulated cover.

The present inventors have recovered thermal energy from prototype vessels by (a) conducting water boiling tests and (b) cooking foods. In preliminary water boiling performance tests, 1 liter of water was boiled in less than 5 minutes. This compares very favorably with combustion cookers on the market, as shown in the table below:

| Manufacturer | Model | Fuel | Boil Time min/liter | Notes |
| --- | --- | --- | --- | --- |
| Envirofit * | M-5000 Wood | wood/biomass | 7 | |
| Envirofit * | Econofire | wood/biomass | 6 | |
| Envirofit * | CH-5200 Charcoal | charcoal | 7 | |
| Envirofit * | Pureflame LPG Stove | LPG, natural gas | 5 | |
| Envirofit * | HM-5000 Plancha | wood/biomass | 10 | |
| Envirofit * | PCS-1 Premium | wood/biomass | 20 | for 5 liters of water |
| Our device | Stored solar pilot | solar | <5 | expected to improve further |

* Source: www.envirofit.org

The present inventors have successfully cooked a variety of foods from several cooking cultures and using a range of cooking techniques with a vessel of molten salt as the heat source, including boiling/simmering: water, rice, lentils, and beans; grill/flat top cooking: chorizo, hamburgers, New York strip steak, roti and naan; frying: flat bread; baking/oven: muffins and bread.

Accordingly, in various embodiments, the devices and methods described herein can:
1. Concentrate and collect solar radiation at high temperatures, e.g., 300-400° C. Using parabolic dish concentrators, the present inventors have melted the salts sodium nitrate and potassium nitrate at temperatures similar to published values, 300° C. and 330° C., respectively. The present inventors have melted chloride mixtures in the lab at 380-400° C.
2. Cook. The present inventors have (a) grilled (steak, burgers), (b) cooked rice and chorizo, and (c) baked bread and muffins by placing the vessel in an enclosed kamado-style (egg-shaped grill) cooker. We have boiled a liter of water in less than 5 minutes.
3. Be scaled. Whatever (a) the concentrating capacity of the parabolic dish (energy capacity and collection temperature), (b) the storage capacity of the thermal storage material, or (c) the energy demands of families, the capacities of the devices can be scaled, e.g., by using larger or more dishes and larger or more storage vessels. The energy requirements of a family of various sizes can be estimated, and the energy storage capacities of various phase change materials described herein can provide enough energy to cook meals. Of course this varies widely with family size and foods cooked: Assuming that a family of five requires about 15 MJ/day of useful energy to cook [~1 kg wood/cap/day×5 people/household×15 MJ/kg wood×0.2 efficiency=15 MJ/day], the energy for a day might be contained in about 20 liters (40 kg at density of 2.2 kg/L) of phase change material, small enough to be contained in one or more bucket-like vessels that can be readily moved. To acquire this energy, about 3 m2 of collection area (e.g., a 2 m diameter dish) would be needed, with a collection-through-storage efficiency of ~25% and solar radiation levels similar to Phoenix, AZ. Analyzing in another way: Indian style rice requires 1.0-1.5 cups of water per cup of rice, and one cup of dry rice has 685 calories. Some families eat only rice in subsistence regions, and eating only rice a family needs 14.5 cups to each have 2000 calories, requiring 1.2 MJ to heat the cooking water from 20 to 100° C.

Figure 7:
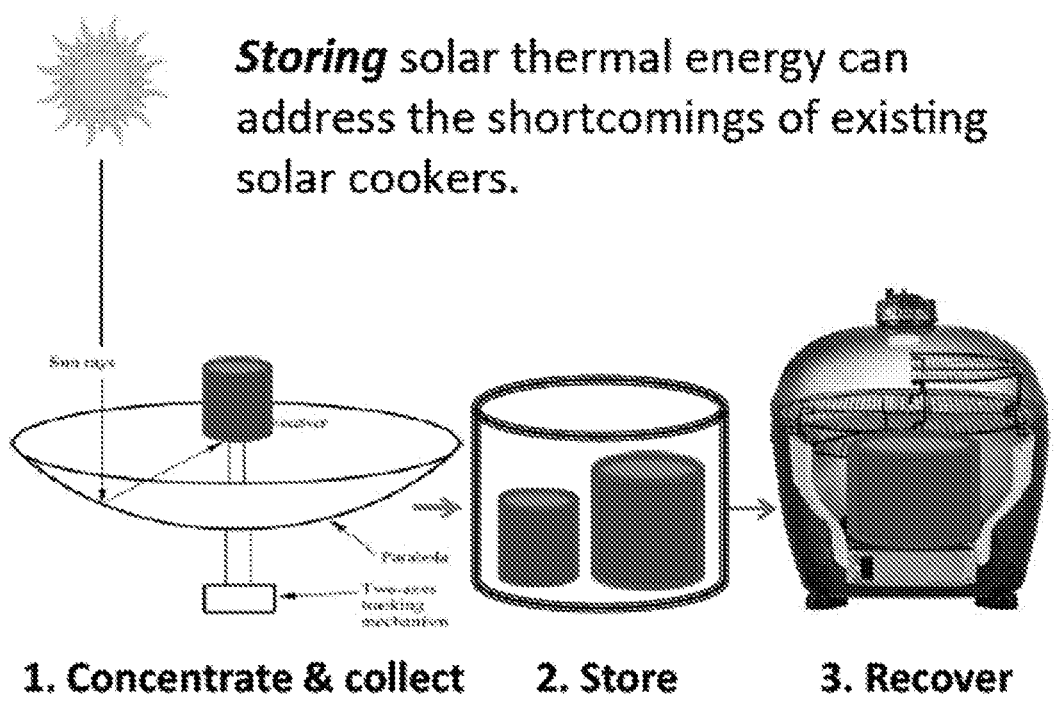

Another embodiment of the disclosure is shown in FIG. 7. In FIG. 7, is shown (1) Concentrate and collect: The vessel containing a phase change material is placed at the focal point of a parabolic dish; the vessel is insulated on all sides, with insulation on the bottom recovered during "charging," and heat transfers through the bottom and up through the vessel, melting the phase change material. (2) Store: Charged vessels are stored in an insulated container until use. (3) Recover: Vessels are moved to the location of use and placed (a) inside a grill, kamado, tandoor, oven or other cooking chamber or (b) where the fire is normally built in a three-stone fire pit, indoors or out. The top insulation is removed to allow immediate heat flow and cooking.

Accordingly, in various embodiments, the disclosure provides

A device comprising: a portable, rechargeable vessel to collect, store, and recover thermal energy.

The device as described above having a portable, rechargeable vessel to store solar thermal energy.

The device as described above storing thermal energy in the 300-400° C. range.

The device as described above using a phase change material that changes phase in the 300-400° C. range, such as potassium nitrate, sodium nitrate, and magnesium chloride/sodium chloride/potassium chloride.

The device as described above using a heat transfer plate to collect thermal energy, including solar radiation, and transfer the heat into the storage vessel.

The device as described above using a heat transfer plate to exchange heat from the storage vessel to the external application such as a cooking pan.

The device as described above using fins to transfer heat energy from the heat transfer plate into the vessel (for storage).

The device as described above using fins to transfer heat out of the vessel to the heat transfer plate (for cooking, etc.).

A process to seal the thermal storage material (above) inside a metal vessel.

The process as described above whereby heating a metal vessel and thermal storage material above the melting point of the storage material.

The process as described above whereby welding a heat transfer plate with fins to the metal vessel.

The process as described above whereby drilling a vent hole in the weld and reheating the vessel.

The process as described above whereby filling the vent hole with weld while the vessel is above the melting point of the thermal storage material.

Finally, it should be readily understood that the present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed devices, systems, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

We claim:

1. A portable, rechargeable vessel for collecting, storing, and recovering thermal energy for cooking, comprising: a structure defining a well and an open-top portion at the top of the well; a phase-change material, wherein the phase-change material is disposed in the well, the phase-change material having a phase change at a temperature in the range of 150-700° C.; one or more thermally-conductive fins interleaved in the phase-change material; and a thermally-conductive heat transfer plate disposed at and substantially covering the open-top portion of the structure, in direct thermal contact with the one or more fins, thereby allowing the transfer plate to directly exchange thermal energy with the phase change material, wherein the transfer plate comprises a solar absorbing material having a solar absorptivity of at least 0.75 disposed at the top surface of the transfer plate in substantial thermal contact with the one or more fins through the transfer plate and configured to heat the phase change material by conducting solar-adsorbed energy to the phase change material through the transfer plate and fins.

2. The vessel of claim 1, wherein the one or more thermally-conductive fins, the transfer plate, or both are made of a material having a thermal conductivity of at least 200 W/m·K at 25° C.

3. The vessel of claim 1, wherein the phase-change material is configured to change phase at a temperature in the range of range of 200-600° C.

4. The vessel of claim 1, wherein the phase-change material is a meltable salt.

5. The vessel of claim 1, wherein the phase-change material includes at least magnesium chloride, sodium chloride, or potassium chloride.

6. The vessel of claim 1, wherein the one or more fins are comprised of one or more thermally-conductive coils, or one or more concentric thermally-conductive tubes.

7. The vessel of claim 1, wherein each of one or more of the fins has one or more slots formed therein, either at the interface between the fin and the transfer plate, the end of the fin remote from the transfer plate, or both.

8. The vessel of claim 1, further comprising a thermometer terminating on a probe end in the phase-change material and terminating on a display end outside of the vessel.

9. The vessel of claim 1, wherein the surface area of the one or more fins is at least 100% of the interior surface area of the well, excluding the transfer plate.

10. The vessel of claim 1, wherein the phase change material fills at least 90% of the empty volume of the well (i.e., not taken up by the fins or by any other structure) at the lowest temperature at which the material is completely melted.

11. The vessel of claim 1, further comprising, surrounding the structure defining the well, an insulative case, the insulative case comprising:
a bottom portion having a side wall and a closed bottom;
a top portion having a side wall;
one or more thermally-insulative materials between the structure defining the well and the top and bottom portions of the case; and
an opening at the top of the top portion, with the opening being configured to allow access to the transfer plate.

12. The vessel of claim 11, further comprising a thermally-insulative lid insulating lid configured to cover the opening and insulate the transfer plate.

13. The vessel of claim 11, wherein the thermally-insulative material is configured such that, when the well is filled with molten potassium nitrate at 350° C., the molten salt does not fall below a temperature of 320° C. for at least five hours.

14. A method for constructing the vessel of claim 1, comprising:
providing a transfer unit comprising the transfer plate and the one or more fins extending from the surface thereof;
providing the structure defining the well, the well having the phase change material disposed therein;
disposing the transfer plate at the open top of the well such that the fins are disposed in the phase change material; and,
while the phase change material is in a molten state, sealing the transfer plate to the structure defining the well.

15. A method of claim 14, comprising:
cutting one or more slots extending from the top or the bottom of each fin;
attaching each fin to the bottom of the transfer plate;
heating the phase change material to its maximum thermal operating point, wherein the maximum thermal operating point is equal to or less than the boiling point of the phase change material a temperature at which the phase change material becomes a liquid;
interfacing the transfer plate with the open-top portion of the structure such that the one or more fins are submersed into the liquefied phase change material and any undispersed air escapes through the one or more slots;
after the transfer plate is interfaced with the open-top portion of the structure, welding the transfer plate at its interface with the structure.

16. A method of claim 14, comprising:
cutting one or more slots extending from the top or the bottom of each fin;
attaching each fin to the bottom of the transfer plate;
heating the phase change material to a temperature at which the phase change material becomes a liquid;
interfacing the transfer plate with the open-top portion of the structure such that the one or more fins are submersed into the liquefied phase change material and any undispersed air escapes through the one or more slots;
after the transfer plate is interfaced with the open-top portion of the structure, welding the transfer plate at its interface with the structure;
drilling a hole in the welded transfer plate at its interface with the structure;
heating the vessel to its maximum thermal operating point, wherein the maximum thermal operating point is equal to or less than the boiling point of the phase change material; and
re-welding the portion of the welded transfer plate at its interface with the structure removed by the drilled hole.

17. A method for collecting and storing thermal energy, the method comprising: providing a source of thermal energy, operatively coupling the heat transfer plate of a vessel of claim 1 to the source of thermal energy, and transferring heat from the source of thermal energy through the heat transfer plate and to the phase change material, such that the phase change material changes phase.

18. A system for collecting and storing thermal energy, the system comprising a source of thermal energy, and a vessel of claim 1, disposed such that its thermally conductive heat-transfer plate is operatively coupled to the source of thermal energy.

19. A method for collecting and recovering thermal energy, the method comprising:
operatively coupling the heat transfer plate of a vessel of claim 1 to a source of thermal energy, and transferring heat from the source of thermal energy through the heat transfer plate and to the phase change material, such that the phase change material changes phase; and then
heating a workpiece different from the source of thermal energy via heat transfer from the phase change material through the transfer plate.

20. The method for claim 19, wherein the workpiece is a foodstuff.

* * * * *